US008019784B2

(12) United States Patent  (10) Patent No.: US 8,019,784 B2
Bendel et al.                  (45) Date of Patent:     Sep. 13, 2011

(54) MANAGING EXTERNAL ROUTINES IN A DATABASE MANAGEMENT SYSTEM

(75) Inventors: Peter Bendel, Holzgerlingen (DE); Gregor Meyer, Loeningen (DE); Stefan Raspl, Tamm (DE)

(73) Assignee: International Business Machines Corporation, Armonk, NY (US)

( * ) Notice: Subject to any disclaimer, the term of this patent is extended or adjusted under 35 U.S.C. 154(b) by 523 days.

(21) Appl. No.: 12/165,998

(22) Filed: Jul. 1, 2008

(65) Prior Publication Data

US 2008/0270455 A1  Oct. 30, 2008

Related U.S. Application Data

(63) Continuation of application No. 11/198,485, filed on Aug. 4, 2005, now abandoned.

(51) Int. Cl.
G06F 7/00 (2006.01)
G06F 17/30 (2006.01)
(52) U.S. Cl. .................. 707/795; 707/805; 707/821
(58) Field of Classification Search .......... 707/600–831; 709/229
See application file for complete search history.

(56) References Cited

U.S. PATENT DOCUMENTS

| | | | |
|---|---|---|---|
| 4,833,594 A * | 5/1989 | Familetti et al. | 713/1 |
| 5,819,251 A | 10/1998 | Kremer et al. | |
| 5,987,463 A | 11/1999 | Draaijer et al. | |
| 6,006,235 A | 12/1999 | Macdonald et al. | |
| 6,052,779 A | 4/2000 | Jackson et al. | |
| 6,393,435 B1 | 5/2002 | Gartner et al. | |
| 6,480,848 B1 | 11/2002 | DeKimpe et al. | |
| 6,697,818 B2 | 2/2004 | Li et al. | |
| 6,820,135 B1 | 11/2004 | Dingman et al. | |
| 6,934,701 B1 | 8/2005 | Hall, Jr. | |
| 6,978,261 B2 | 12/2005 | Cotner et al. | |
| 7,299,224 B2 | 11/2007 | Doerre et al. | |
| 2002/0038450 A1 | 3/2002 | Kloppmann et al. | |
| 2002/0059259 A1 | 5/2002 | Cotner et al. | |
| 2004/0044655 A1 | 3/2004 | Cotner et al. | |
| 2008/0288553 A1 | 11/2008 | Bendel et al. | |

OTHER PUBLICATIONS

Hsiao et al., A transactional resource manager, 2000, ACM, 518-528.*
Mittal, Neeraj et al., "Database Managed External File Update", IEEE, Apr. 2-6, 2001, pp. 557-564.
Yang, Jiong et al., "Dynamic Adaptive File Management in a Local Area Network", IEEE, Apr. 10-13, 2000, pp. 368-375.
U.S. Appl. No. 11/198,485, Image File Wrapper printed Feb. 15, 2011, 3 pages.
U.S. Appl. No. 12/166,129, Image File Wrapper printed Feb. 15, 2011, 1 page.
Interview Summary mailed Apr. 28, 2011 for U.S. Appl. No. 12/166,129, 3 pages.
Notice of Allowance mailed May 12, 2011 for U.S. Appl. No. 12/166,129, 12 pages.

(Continued)

*Primary Examiner* — Jean B Fleurantin
(74) *Attorney, Agent, or Firm* — Francis Lammes; Stephen J. Walder, Jr.; Elissa Y. Wang

(57) ABSTRACT

A method for managing an external routine in a computer implemented database management system includes creating a first table for storing external routines in a data store coupled to the database management system. An external routine is stored in the first table so that the database management system is allowed to automatically manage any modification related to the external routine and to control access to the external routine such that administrative support is minimized.

10 Claims, 3 Drawing Sheets

OTHER PUBLICATIONS

Supplemental Notice of Allowability mailed Jul. 13, 2011 for U.S. Appl. No. 12/166,129, 9 pages.

Hsiao, Hui-I et al., "Database Managed External File Update", Google Scholar. 2001, pp. 1-22.

* cited by examiner

| | Routine ID (302) | Routine body (304) | Program Language (306) |
|---|---|---|---|
| 150a | IDMXRUN | <content of shared library IDMXRUN> | C |
| 150b | IDMX.JAR | <content of jar file IDMX.JAR> | JAVA |
| | IDMS | <content of CLR assembly IDMS> | CLR |

160

MANAGING EXTERNAL ROUTINES IN A DATABASE MANAGEMENT SYSTEM

CROSS-REFERENCE TO RELATED APPLICATIONS

Under 35 USC §120, this application is a continuation application and claims the benefit of priority to U.S. patent application Ser. No. 11/198,485, filed Aug. 4, 2005, entitled "Method for Managing External Routines in a Database Management System", and is also related to co-pending application Ser. No. 12/166,129 filed concurrently on even-date herewith, entitled, "Medium and System for Managing External Routines in a Database Management System", all of which is incorporated herein by reference.

FIELD OF THE INVENTION

The present invention relates to database management systems and in particular, to managing routines, such as stored procedures or user defined functions, in a database management system.

BACKGROUND OF THE INVENTION

Database management systems (DBMS) maintain and manage data stored in databases. Management includes storing, deleting, retrieving and updating the data. Typically, data stored in a database includes plain values, e.g., numbers and alphanumeric strings, and complex objects such as images, documents and spatial data. The DBMS typically is hosted by a database server that is accessible by a plurality of client systems via a network.

In state of the art systems, the DBMS is capable of invoking executable code to manipulate the data in the database. In some systems, when instructed, the DBMS can automatically load and execute the code. Such executable code, known as an external routine, can be a stored procedure (STP) or a user defined function (UDF), which can be called within a statement or query from a client system. External routines are so named because they are not predefined and built into the DBMS. They can be defined by database users or applications.

Typically, external routines are stored in a shared library in a file system in a database server hosting the DBMS. The external routines are registered in a catalog maintained by the DBMS so that the DBMS can locate an external routine in the shared library. While this configuration is convenient, it presents a number of logistical challenges.

For instance, because the routines reside in the file system, inconsistencies between the file system and the catalog can arise, e.g., after a backup or restore function. A system administrator must ensure that any changes to the catalog are synchronized with the routines residing in the file system and vice versa. This is an added burden on the system administrator, and becomes particularly tedious if the database is partitioned over a plurality of nodes.

Moreover, because the routines reside in the file system, security concerns can arise. Typically, access to the file system is controlled by the server's operating system, while access to the database is controlled by the DBMS. The access control policies for the server are not necessarily identical to those of the DBMS, and therefore, a client who has access to the file system can inadvertently or intentionally modify, delete or replace a routine. This can cause serious system disruptions that require administrative attention. To prevent this, the system administrator has the added burden of controlling access to the file system and also protecting the external routines.

SUMMARY OF THE INVENTION

In one illustrative embodiment, a computer-implemented method, in a database server having a file system and a database management system, is provided for managing an external routine in a data store interoperably coupled with the database management system. The method comprises creating, by the database management system, a first table for storing at least one external routine having an identifier and a body portion comprising an implementation of the at least one external routine, in the data store. The implementation includes program code in a language environment associated with the external routine. The method further comprises storing, by a routine manager in the database management system, the external routine in the first table by storing the identifier in a first column and storing the body portion in a second column as a database object and, by the database management system, automatically managing any modification in relation to the external routine, and controlling access to the external routine. Storing the body portion in the second column includes compiling, by the database server, the program code prior to storing the body portion in the second column and storing compiled program code in the second column such that the external routine can be executed directly. The method further comprises providing, by the database management system, a plurality of external compilation modules in the file system. Each external compilation module is associated with a language environment. The method further comprises creating, by the database server, a mapping in the database management system that maps each language environment to the associated external compilation module, using, by the database management system, the mapping to invoke the external compilation module associated with the language environment of the external routine, and utilizing, by the database server, the invoked external compilation module to compile the program code.

In another illustrative embodiment, a computer-implemented method, in a database server having a file system and a database management system, is provided for managing an external routine in a data store interoperably coupled with the database management system. The method comprises creating, by the database management system, a first table for storing at least one external routine having an identifier and a body portion comprising an implementation of the at least one external routine, in the data store. The implementation includes program code in a language environment associated with the external routine. The method further comprises storing, by a routine manager in the database management system, the external routine in the first table by storing the identifier in a first column and storing the body portion in a second column as a database object and, by the database management system, automatically managing any modification in relation to the external routine, and controlling access to the external routine. Storing the body portion in the second column includes compiling, by the database server, the program code prior to storing the body portion in the second column and storing compiled program code in the second column such that the external routine can be executed directly. The method further comprises providing, by the database management system, a plurality of execution engines in the file system. Each execution engine is associated with a language environment. The method further comprises creating, by the database server, a mapping in the database management system that maps each language environment to the associated execution engine, receiving, by the database management system, a call to execute the external routine, using, by the database management system, the mapping to invoke the execution engine associated with the language environment associated with the called external routine, and utilizing, by the database server, the invoked execution engine to execute the compiled program code of the external routine.

These and other features and advantages of the present invention will be described in, or will become apparent to those of ordinary skill in the art in view of, the following detailed description of the example embodiments of the present invention.

According to versions of the present invention, external routines are stored in the data store and treated as database content that is managed directly by the database management system. Synchronization processes already in place for ensuring consistency throughout the database can be utilized to ensure consistency between the external routines and catalog entries. In addition, the access control policies applying to data in the database can be easily extended to the external routines thereby protecting them from unintentional modifications and malicious users.

DETAILED DESCRIPTION OF THE INVENTION

Embodiments of the present invention relate to managing external routines, such as stored procedures and user-defined functions, in a computer implemented database system. Various modifications to the preferred embodiment and the generic principles and features described herein will be readily apparent to those skilled in the art. For example, the following discussion is presented in the context of a DB2® database environment available from IBM® Corporation. It should be understood, however, that the present invention is not limited to DB2 and may be implemented with other relational database systems. Thus, the present invention is to be accorded the widest scope consistent with the principles and features described herein.

Figures 1, 3:
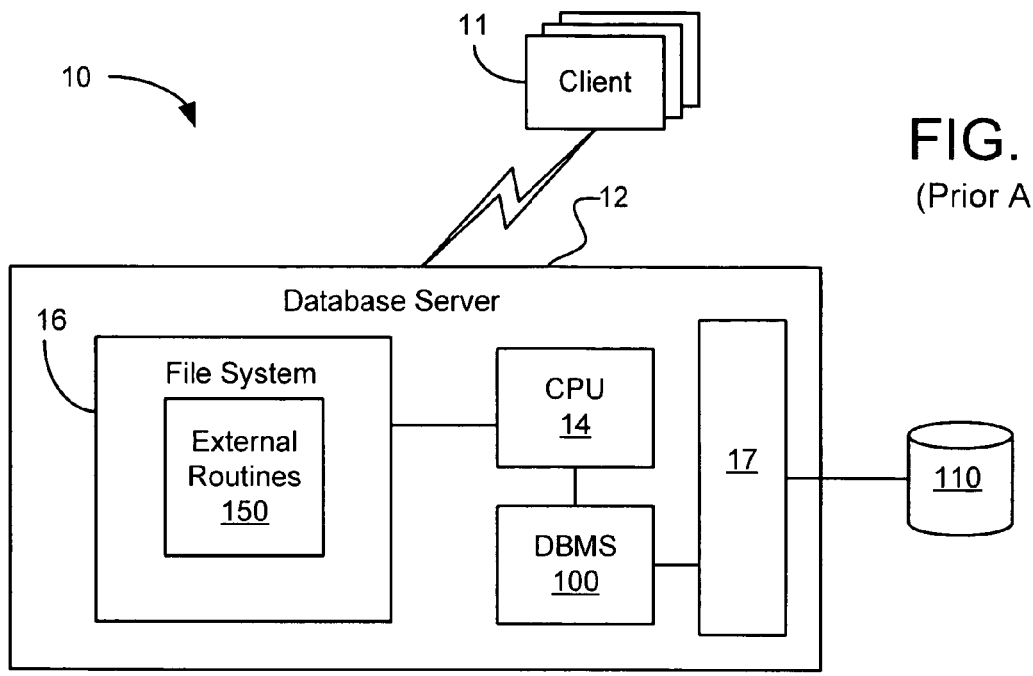
FIG. 1 is an exemplary computer hardware environment that utilizes a DBMS.
FIG. 3 is a block diagram illustrating a routine table

An exemplary computer hardware environment that utilizes a DBMS is illustrated in FIG. 1. A distributed computer system 10 utilizes a network to connect client systems 11 executing client applications to a database server 12 executing software and other computer programs. These components can be coupled to one another by various networks, including LANs, WANs, and the Internet. Each client computer 11 and the server 12 additionally comprises an operating system and one or more computer programs (not shown).

The database server 12 includes a central processing unit (CPU) 14, a file system 16, and the DBMS 100 coupled to at least one data store 110. The server 12 uses a data store interface 17 for connecting to the data store 110. The data store interface 17 can be connected to the DBMS 100, which supports access to the data store 110. The DBMS 100 can be a relational database management system (RDBMS), such as for example, the DB2® system developed by IBM Corporation. The interface 17 and DBMS 100 can be located at the server 12 (as shown) or may be located on one or more separate machines. The data store 110 may be geographically distributed.

As is shown, external routines 150 are stored in the file system 16 of the server 12. The CPU 14, via an operating system (not shown), manages the file system 16 and the external routines 150 stored therein. Typically when a client system 11 sends a query to the DBMS 100 and the query includes a call to an external routine 150, the DBMS 100 checks one or more catalogs (not shown) to determine whether and where the called external routine 150 resides in the server 12. Once located, the DBMS 100 accesses the external routine 150 in the file system 16 through the CPU 14.

As stated above, because the external routines 150 are stored in the file system 16, administrative measures must be taken to prevent discrepancies between the information in the file system 16 and the information in the DBMS 100. For example, an external routine 150 can be removed from the file system 16 or moved to a different address. A system administrator must ensure that such modifications are reflected in the corresponding catalogs because the DBMS 100 is not automatically notified of such modifications. This can be a daunting task, especially if the database is partitioned across multiple nodes. In addition, administrative measures must be taken to control access to the file system 16 and to protect the external routines 150 from malicious intruders.

The present invention substantially eliminates these and other administrative burdens. According to a version of the present invention, the external routines 150 are stored in the data store 110 and treated as database content so that the DBMS 100 can directly manage and maintain the external routines 150. By storing the external routines 150 in the data store 110 and treating them as database content, existing processes for synchronizing data and for controlling access to the data can be utilized. Because the DBMS 100 performs such processes automatically, the system administrator can direct his/her attention to other matters.

Figure 2:
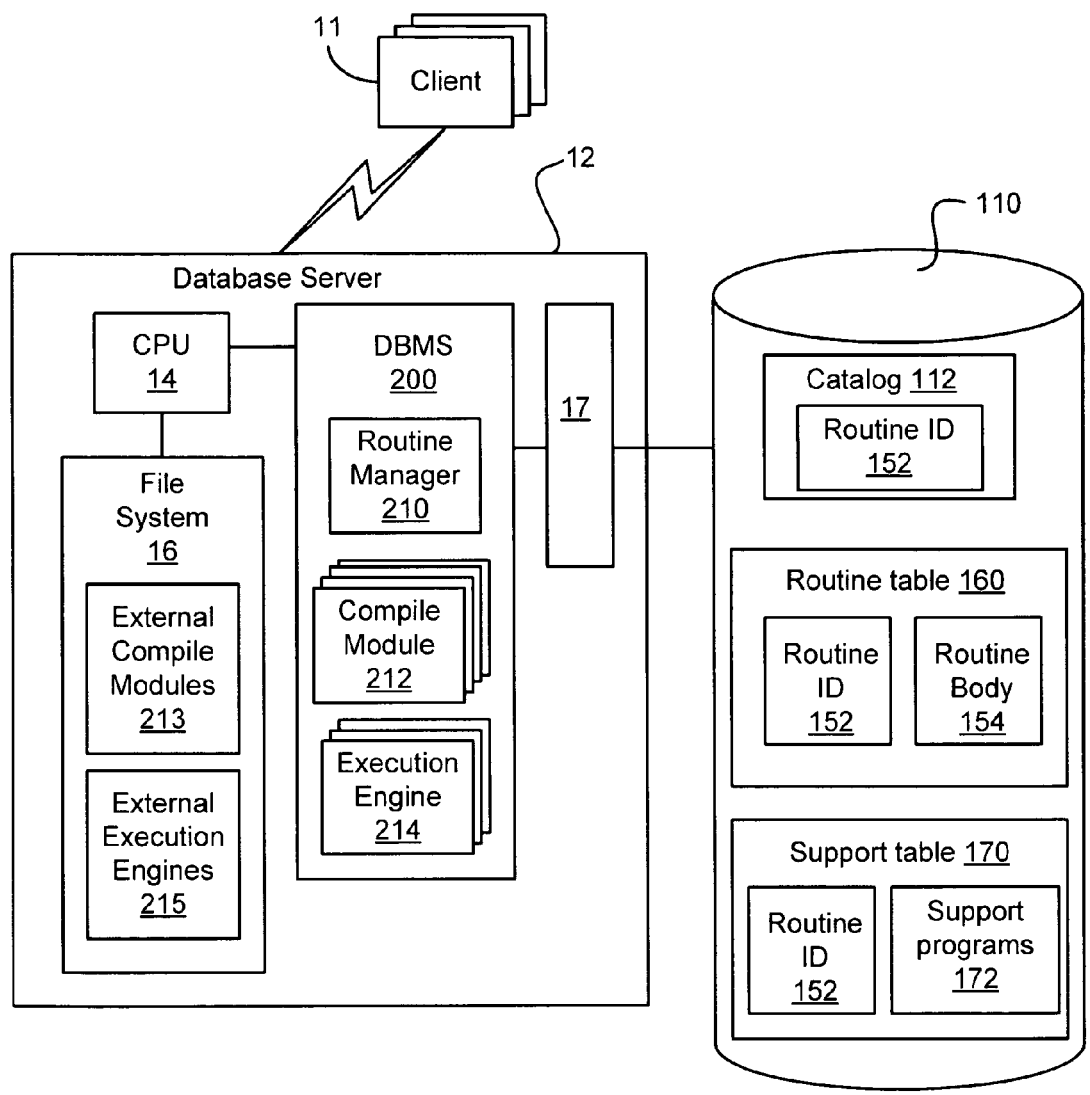
FIG. 2 is an exemplary computer hardware environment that can be used with a version of the present invention.

FIG. 2 is an exemplary computer hardware environment that can be used with a version of the present invention. According to a preferred embodiment of the present invention, the DBMS 200 includes a routine manager 210 that handles the external routines 150 stored in the data store 110. The routine manager 210 stores the external routines 150 in at least one routine table 160 in the data store 110.

In one embodiment, an external routine 150 can be registered in a catalog 112, which is also stored in the data store 110 and maintained by the DBMS 200. In this embodiment, the external routine 150 is defined by a data definition language (DDL) statement, which is typically used to register the external routine 150 in the catalog 112. In another embodiment, the routine can be loaded into the database using other statements that include functions or procedures that read the external program and convert it into database values. For simplicity of the presentation we treat these statements as DDL statements as well.

The DDL statement, also referred to as a routine definition, is typically provided by a system administrator or by a client system user, and includes an identifier 152 associated with the external routine 150, parameters, return codes and operation characteristics of the external routine 150. While the current DDL statement refers to an external routine 150 in the file system 16 of the server 12 (FIG. 1), the DDL statement according to a preferred embodiment of the present invention refers to an external routine 150 stored in the routine table 160. Thus, when an external routine 150 is invoked, the DBMS 200 can be directed to the routine table 160 in the data store 110, as opposed to the file system 16 in the server 12.

FIG. 3 is a block diagram illustrating a routine table 160 according to a version of the present invention. The routine table 160 includes a routine ID column 302 and a routine body column 304. The routine ID column 302 stores each external routine's 150 identifier 152, which can be the external routine's name or some other item associated uniquely with the external routine 150. The identifier 152 for the external routine 150 stored in the routine ID column 302 is preferably the same routine identifier 152 provided by the routine's DDL statement and stored in the catalog 112.

The routine body column 304 stores a routine body 154, i.e., implementation, of each of the external routines 150. In general, the routine body 154 includes program code in a program language implementing the external routine 150. For example, if the external routine 150a is implemented in a compiled language, such as C, the contents of one or more shared libraries for the external routine 150a are stored in the routine body column 304. Whereas, if the external routine 150b is implemented in an interpreted language, such as JAVA, the contents of one or more JAR files are stored in the routine body column 304. In a preferred embodiment, the routine body 154 of an external routine 150 is stored as a binary large object (BLOB) and is treated as a database object.

Referring again to FIG. 2, in one version, the routine body 154 is converted into executable code and the executable code corresponding to the routine body 154 is stored in the routine table 160 as a BLOB. The conversion into executable code can be performed outside of the database server 12, e.g., by a client 11, and then loaded into the routine table 160 from the client 11. Alternatively, in another version, the DBMS 200 can include one or more compilation modules 212. Each compilation module 212 is associated with a program language and is configured to compile program code in the associated program language into executable, i.e., optimized, code. Accordingly, when an external routine 150 is registered with the DBMS 200 or read from a client system 11, the routine manager 210 can automatically invoke an appropriate compilation module 212, which compiles the routine body 154. The compiled routine body can then be stored in the routine table 160.

In another version, one or more external compilation modules 213 can be provided in the file system 16 of the server 12. The database administrator can create a mapping in the DBMS 200 during a system configuration process that maps a program language to its associated external compilation module 213. Thus, when an external routine 150 is registered with the DBMS 200 or read from a client system 11, the routine manager 210 can use the mapping to invoke an appropriate external compilation module 213, which compiles the routine body 154. Those skilled in the art would readily recognize that the internal compilation modules 212 and external compilation modules 213 can be implemented alone or in combination. Accordingly the configuration illustrated in FIG. 2 is exemplary and is not intended to be limiting.

Referring again to FIG. 3, in one version, the routine table 160 can include a program language column 306 that indicates the language environment in which the routine body 154 is to be executed. Thus, when an external routine, e.g., 150a, is retrieved, the routine manager 210 is able to determine which language environment, e.g., C, must be used to execute the routine body 154.

Referring again to FIG. 2, in another version, a routine support table 170 is provided in the data store 110. The support table 170 stores support programs 172 that may be needed by an external routine 150. The support programs 172 are preferably stored as BLOBs and correlated to the routine ID 152.

In a preferred embodiment, the DBMS 200 includes a plurality of execution engines 214. Each engine 214 is associated with a language environment, and is configured to execute external routines 150 implemented in the associated language environment. Accordingly, upon invocation of an external routine 150, the routine manager 210 can invoke the appropriate execution engine 214, which automatically loads and executes the routine body 154.

Similar to the compilation modules 212, external execution engines 215 can be provided in the file system 16 of the server 12. The database administrator can create a mapping in the DBMS 200 during a system configuration process that maps a program language to its associated external execution engine 215. Thus, when an external routine 150 is called, the routine manager 210 can use the mapping to invoke an appropriate external execution engine 215 to load and execute the routine body 154.

Figure 4:
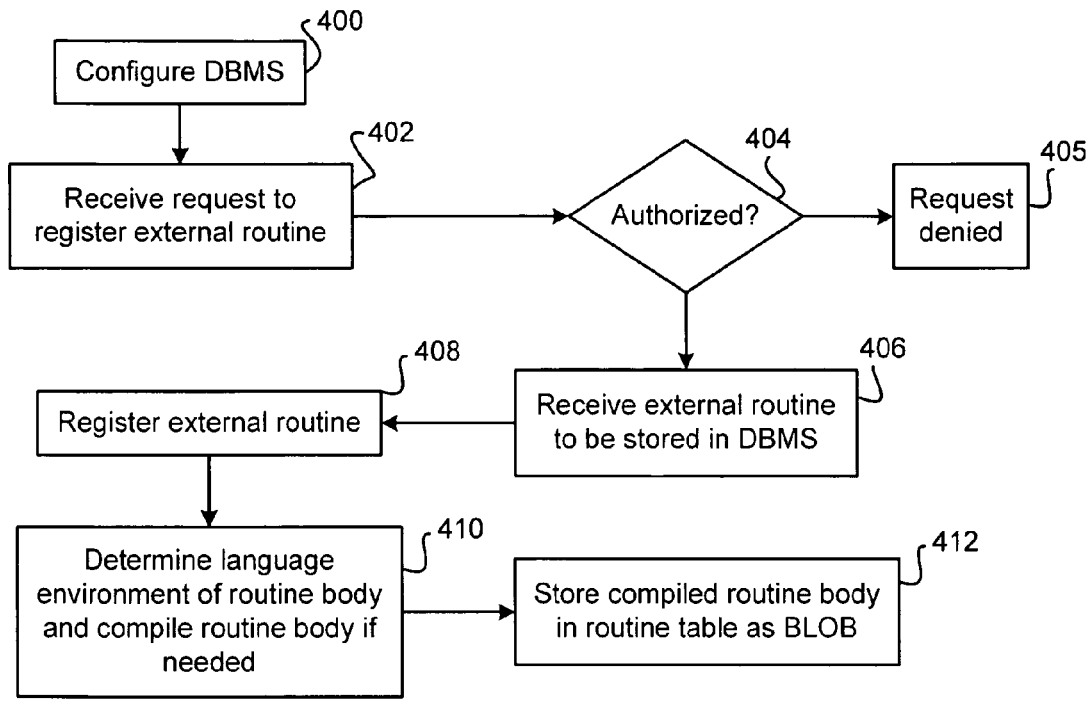
FIG. 4 is a flowchart illustrating a process for storing an external routine in a DBMS according to a version of the present invention.
Figure 5:
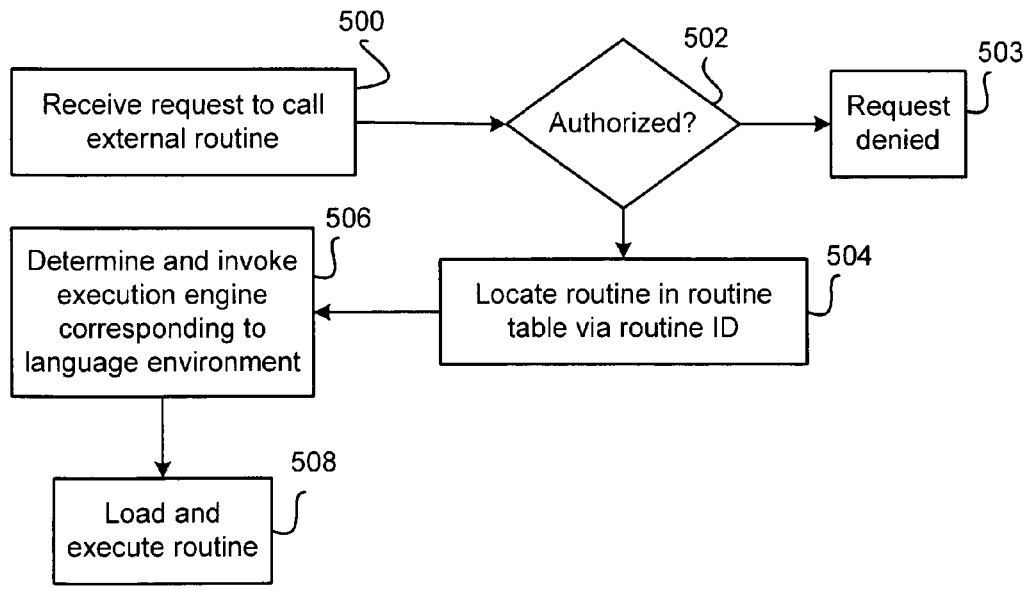
FIG. 5 is a flowchart illustrating a process for invoking an external routine in the DBMS according to a version of the present invention.

To describe better the relationships between the various components of the DBMS 200, please refer to FIG. 4 and FIG. 5. FIG. 4 is a flowchart illustrating a process for storing an external routine 150 in a DBMS 200 according to a version of the present invention, and FIG. 5 is a flowchart illustrating a process for invoking an external routine 150 in the DBMS 200 according to a version of the present invention. Referring first to FIG. 2 and FIG. 4, the storage process starts by configuring the DBMS 200 (step 400). The configuration process includes creating the routine table 160 and, optionally, the support table 170, and defining the mapping between program languages and external compilation modules 213 and external execution engines 215. Preferably, the configuration process is performed once before any external routines 150 have been stored.

Once the DBMS 200 has been configured, it is ready to store and manage external routines 150. In a preferred embodiment, each client 11 includes an interface (not shown) that allows a user to register an external routine 150 with the DBMS 200. The interface allows the user to create the DDL statement for the external routine 150, and to transmit the routine body 154 associated with the external routine 150 to the DBMS 200. The database administrator can register an external routine 150 in a similar manner.

In the registration process, the DBMS 200 receives a request to register an external routine 150 with the DBMS 200 (step 402). The DBMS 200 determines if the requestor is authorized to make such a request (step 404). The DBMS 200 can check its access control policies in a known manner to make this determination. If the requestor is authorized, the request is granted. Otherwise, the request is denied (step 405). In this manner, the DBMS 200 protects itself from malicious users attempting to load a Trojan horse, which when executed can damage the integrity of the DBMS 200 or the data in the database.

Once the request is authorized, the DBMS 200 receives the DDL statement defining the external routine 150 and its routine body 154 (step 406). In one version, the routine manager 210 can use the DDL statement to register the external routine 150, for example by creating an entry for the routine in the catalog 112 in the data store 110 (step 408). As stated above, the routine ID 152 is stored in the catalog 112 so that the catalog entry corresponding to the external routine 150 refers to an entry in the routine table 160.

The routine manager 210 determines from the DDL statement in which language environment the routine body 154 is implemented and if it is already compiled, stores the routine body in the routine table 160. Otherwise it invokes either a compilation module 212 within the DBMS 200 or an external compilation module 213 to compile the routine 154 into optimized code (step 410). Notably, if the language environment is one that is directly understood by the DBMS 200, e.g., SQL, the routine body 154 can be converted to the optimized code that is executable by the DBMS 200 during runtime. As noted above, if the language environment corresponds to an external compilation module 213, the routine manager 210 refers to the mapping to locate the external compilation module 213 in the file system 16. Once compiled, the optimized code corresponding to the routine body 154 is stored in the routine table 160 as a BLOB along with the routine ID 152 (step 412).

In a preferred embodiment, a similar process is implemented when a user of a client system 11 or a system administrator submits a request to replace, update, or remove an external routine 150 that is stored in the DBMS 200. These processes can be implemented as stored procedures in the DBMS 200 and called using a standard CALL SQL statement. The privilege to call these and similar stored procedures can be controlled by access control polices enforced by the DBMS 200. The DBMS 200 will grant such requests only if the requestor is authorized to make such a request and only if certain conditions are met, e.g., the subject routine 150 is not in use. In this manner, the routine table 160 is protected by the DBMS 200. Moreover, when such a request to store, replace or remove an external routine 150 is granted, the DBMS 200 can ensure that corresponding changes to the catalog 112 are implemented throughout the database, thereby preserving consistency between the catalog 112, the routine table 160, and the database.

After the external routine 150 has been stored in the DBMS 200, it can be invoked by a client system 11 via an SQL statement/query. A process for invoking the external routine 150 according to a preferred embodiment of the present invention is illustrated in FIG. 5.

Referring to FIG. 2 and FIG. 5, the invocation process begins by receiving a request to call the external routine 150 (step 500). The DBMS 200 determines if the requestor is authorized to make such a request (step 502). The DBMS 200 can check its access control policies in a known manner to make this determination. If the requestor is authorized, the request is granted. Otherwise, the request is denied (step 503).

If the request to call the external routine 150 is granted, the routine manager 210 proceeds to process the request. Typically, the request includes the routine ID 152, and the routine manager 210 uses the routine ID 152 to locate the routine 150 in the routine table 160 using the routine ID 152 (step 504). Note that because the routine 150 is stored in the database 110 as a database value, the requester can select the routine 150 in the same manner as selecting any other database value. In one embodiment, the routine manager 120 can check the catalog 112 to ensure that the requested routine 150 is registered in the DBMS 200 before it goes to the routine table 160.

The routine manager 210 then determines the language environment in which the routine body 154 is implemented and invokes either an execution engine 214 within the DBMS 200 or an external execution engine 215 corresponding to the language environment (step 506). As noted above, if the language environment corresponds to an external execution engine 215, the routine manager 210 refers to the mapping to locate the external execution engine 215 in the file system 16. Once invoked, the execution engine 214, 215 dynamically loads the optimized code corresponding to the routine body 154 from the routine table 160 and executes the routine body 154 (step 508).

According to versions of the present invention, external routines are stored as values in a database that is managed by a DBMS. In a preferred embodiment, the values are binary large objects (BLOBs) in a database table. By storing the external routines in the database, as opposed to in the file system of the server, the DBMS automatically manages modifications affecting the external routines and also controls access to the external routines so that the integrity of the database is preserved. Because the DBMS automatically performs these administrative functions, the system administrator can direct his/her attention to other matters.

In other aspects of the present invention, the DBMS hosts and/or invokes predefined compilation modules and execution engines to automatically compile external routines and to automatically execute compiled routines, respectively. Accordingly, the DBMS can compile and execute external routines implemented in practically any language environment.

Embodiments of the present invention relate to managing external routines, such as stored procedures and user-defined functions, in a computer implemented database system. The present invention has been described in accordance with embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A computer-implemented method, in a database server having a file system and a database management system, for managing an external routine in a data store interoperably coupled with the database management system, the method comprising:

creating, by the database management system, a first table for storing the external routine having an identifier and a body portion comprising an implementation of the external routine, in the data store, wherein the implementation of the external routine includes program code in a language environment associated with the external routine;

storing, by a routine manager in the database management system, the external routine in the first table by storing the identifier in a first column and storing the body portion in a second column as a database object;

automatically and directly managing, by the database management system, any modification in relation to the external routine;

controlling, by the database management system, access to the external routine, wherein storing the body portion in the second column includes compiling, by the database server, the program code prior to storing the body portion in the second column and storing the compiled program code in the second column such that the external routine can be executed directly;

providing, by the database management system, a plurality of external compilation modules, wherein each external compilation module is associated with a language environment;

creating, by the database server, a mapping in the database management system that maps each language environment to the associated external compilation module;

using, by the database management system, the mapping to invoke the external compilation module associated with the language environment of the external routine; and utilizing, by the database server, the invoked external compilation module to compile the program code.

2. The method of claim 1 wherein the external routine is either a stored procedure or a user defined function.

3. The method of claim 1 further comprising:

providing, by the database management system, a data definition language statement that includes an identifier of the external routine; and storing, by the database management system, the identifier of the external routine in at least one catalog and in the first table such that the identifier in the at least one catalog refers to the identifier of the external routine in the first table.

4. The method of claim 1 wherein the database object is a binary large object.

5. The method of claim 1 further comprising:

providing, by the database management system, a plurality of predefined compilation modules in the database management system, wherein each compilation module is associated with a language environment; and utilizing the predefined compilation module associated with the language environment of the external routine to compile the program code.

6. A computer-implemented method, in a database server having a file system and a database management system, for managing an external routine in a data store interoperably coupled with the database management system, the method comprising:

creating, by the database management system, a first table for storing the external routine having an identifier and a body portion comprising an implementation of the external routine, in the data store, wherein the implementation of the external routine includes program code in a language environment associated with the external routine;

storing, by a routine manager in the database management system, the external routine in the first table by storing the identifier in a first column and storing the body portion in a second column as a database object;

automatically and directly managing, by the database management system, any modification in relation to the external routine;

controlling, by the database management system, access to the external routine, wherein storing the body portion in the second column includes compiling, by the database server, the program code prior to storing the body portion in the second column and storing the compiled program code in the second column such that the external routine can be executed directly;

providing, by the database management system, a plurality of execution engines, wherein each execution engine is associated with a language environment;

creating, by the database server, a mapping in the database management system that maps each language environment to the associated execution engine;

receiving, by the database management system, a call to execute the external routine;

using, by the database management system, the mapping to invoke the execution engine associated with the language environment associated with the called external routine; and utilizing, by the database server, the invoked execution engine to execute the compiled program code of the external routine.

7. The method of claim 6 wherein the external routine is either a stored procedure or a user defined function.

8. The method of claim 6 further comprising:

providing, by the database management system, a data definition language statement that includes an identifier of the external routine; and storing, by the database management system, the identifier of the external routine in at least one catalog and in the first table such that the identifier in the at least one catalog refers to the identifier of the external routine in the first table.

9. The method of claim 6 wherein the database object is a binary large object.

10. The method of claim 6 further comprising:

providing, by the database management system, a plurality of predefined compilation modules in the database management system, wherein each compilation module is associated with a language environment; and utilizing the predefined compilation module associated with the language environment of the external routine to compile the program code.

* * * * *